United States Patent [19]

Ono

[11] Patent Number: 5,377,096

[45] Date of Patent: Dec. 27, 1994

[54] DIGITAL ACTUATOR CONTROLLER USING LOW-PASS FILTER

[75] Inventor: Hiroyuki Ono, Fujisawa, Japan

[73] Assignee: International Business Machines Corporation, Armonk, N.Y.

[21] Appl. No.: 991,002

[22] Filed: Dec. 16, 1992

[51] Int. Cl.[5] ............... G05B 19/18; G11B 21/02
[52] U.S. Cl. ................... 364/176; 364/167.01; 360/75; 369/44.29
[58] Field of Search ............ 364/176, 177, 167.01; 369/32, 44.28, 44.29, 44.35, 44.36; 318/560, 561, 569–574, 600, 611, 615–618, 632, 636; 360/77.01–78.15, 69, 75

[56] References Cited

U.S. PATENT DOCUMENTS

| | | | |
|---|---|---|---|
| 4,536,809 | 8/1985 | Sidman | 360/77.04 |
| 4,788,608 | 11/1988 | Tsujisawa | 360/77.04 |
| 5,206,570 | 4/1993 | Hargarten et al. | 360/78.04 |
| 5,257,252 | 10/1993 | Barnes et al. | 364/44.29 |

*Primary Examiner*—Roy N. Envall, Jr.
*Assistant Examiner*—Steven R. Garland
*Attorney, Agent, or Firm*—Steven W. Roth; Andrew J. Dillon

[57] ABSTRACT

The digital actuator controller of the present invention reduces the effect of aliasing peculiar to the digital control by inserting a low-pass filter (LPF), which was considered inadequate in the past, between a digital-to-analog converter and a power amplifier to thereby reduce the gain in the high frequency region.

20 Claims, 3 Drawing Sheets

DIGITAL ACTUATOR CONTROLLER USING LOW-PASS FILTER

FIELD OF THE INVENTION

The present invention relates to a digital actuator controller of a magnetic recording apparatus, and more particularly to a digital actuator controller capable of reducing the effect of aliasing peculiar to digital control.

BACKGROUND OF THE INVENTION

In the actuator control of a magnetic recording apparatus, particularly a hard disk drive (HDD), aliasing caused by mechanical resonances of a head suspension would be a problem. To solve the problem, an analog notch filter turned to a resonance point is widely used. This would be effective if the resonance frequency does not vary. However, the resonance frequency may vary to a certain degree to deviate from the characteristic of the notch filter. Therefore, in the method using the conventional notch filter, it is necessary to strictly control resonance modes of the head suspension, which involves a problem of cost and quality.

IBM Technical Disclosure Bulletin, Vol. 33, No. 3A, August 1990, pp. 222-223, proposes that an elliptic filter may be used instead of the conventional notch filter. The elliptic filter has an advantage that it introduces the least amount of phase-lag which, however, cannot be zero. The elliptic filter involves a problem also if resonance frequencies vary widely and is expensive as compared with the conventional notch filter. The above literature describes that the use of low-pass filters is generally ruled out since they cause very large phase shifts at the servo zero db crossover frequency (ZCF).

In respect of digital control, for example, U.S. Pat. No. 4,398,228 proposes to remove the effect of mechanical resonances by employing the same sampling and mechanical resonance frequencies. Since the sampling frequency is uniquely determined based on the rotational speed of and the number of sectors on a disk, the resonance frequency is practically adjusted to the sampling frequency. However, it is difficult to keep the resonance frequency constant.

SUMMARY OF THE INVENTION

It is a principal object of the invention to provide a digital actuator controller in which resonances modes of a head suspension may not be strictly controlled.

Another object of the present invention is to provide a digital actuator controller which can solve a problem of mechanical resonances with a simple configuration.

As described above, in the prior art methods, the resonance modes of the head suspension had to strictly controlled, which involved a problem of cost and quality. The digital actuator controller of the present invention reduces the effect of aliasing peculiar to the digital control by inserting a low-pass filter (LPF), which was considered inadequate in the past, between a digital-to-analog converter and a power amplifier to thereby reduce the gain in the high frequency region. Since such a LPF affects significantly the frequency characteristic in not only the high frequency region but also the low frequency region, the present invention provides means for digitally compensating for the effect of the LPF on the low frequency region below the Nyquist frequency. The problem of the mechanical resonances in the high frequency region above the Nyquist frequency can thereby be solved.

BRIEF DESCRIPTION OF THE DRAWINGS

FIG. 4 is a graph showing frequency characteristic in which loss caused by the insertion of the LPF in the low frequency region has been digitally compensated for.

DETAILED DESCRIPTION OF THE INVENTION

Figure 1:
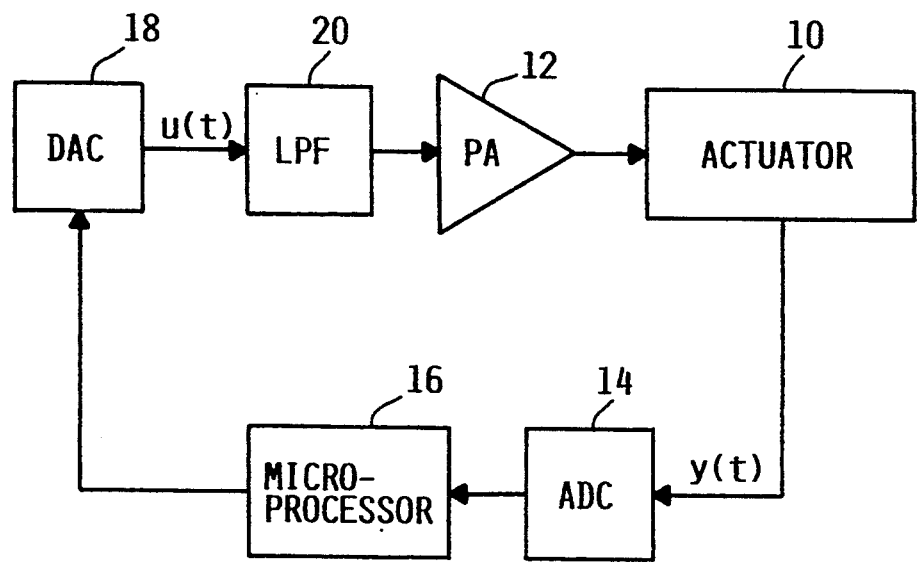
FIG. 1 is a block diagram showing a preferred embodiment of the invention.

The configuration of a digital actuator controller according to the present invention is illustrated in FIG. 1. The digital actuator controller comprises an actuator 10 including a head lo suspension assembly and a DC motor (typically, a voice coil motor) for moving a head, a power amplifier (PA) 12 for driving the actuator 10, an analog-to-digital converter (ADC) 14 for converting a signal y(t) indicating a head position from the actuator 10 to a digital signal, a microprocessor 16 for generating a control signal for moving the head to a desired position in response to the digital position signal, a digital-to-analog converter (DAC) 18 for converting the digital control signal from the microprocessor 16 to an analog control signal u(t), and an analog low-pass filter (LPF) 20 inserted between the DAC 18 and the power amplifier 12.

Conventionally, a notch filter was connected at the position of the LPF 20 illustrated, which presented the aforementioned problems. Therefore, the present invention uses the LPF instead thereof and provides means for digitally compensating for the reduction of gain in the region from the cutoff frequency of the LPF to the Nyquist frequency.

The principle of operations of the digital actuator controller of FIG. 1 is next described with reference to FIG. 2 to FIG. 4. Each of FIG. 2 to FIG. 4 shows the frequency characteristic of a controlled system including the actuator 10 in which the vertical axis represents gain while the horizontal axis represents frequency (in logarithmic scale).

Figure 2:
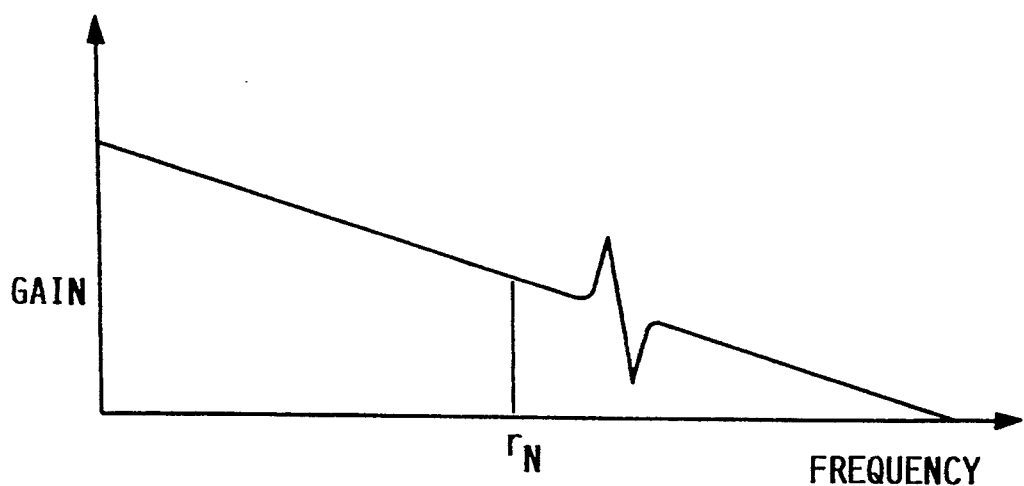
FIG. 2 is a graph showing an example of frequency characteristic in which a peak occurs due to a mechanical resonance in the high frequency region above the Nyquist frequency $f_N$.

FIG. 2 shows the frequency characteristic of a system not including the LPF 20, which is an attenuation of $-12dB/oct$ in case of a double integral system. Further, a peak in the frequency characteristic due to the mechanical resonances occurs in the high frequency region above the Nyquist frequency $f_N$.

Figure 3:
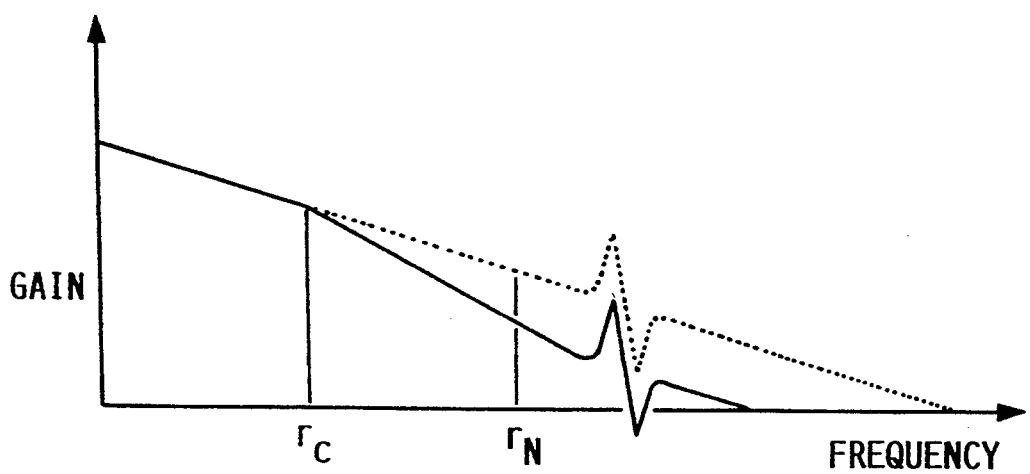
FIG. 3 is a graph showing frequency characteristic in the case where a low-pass filter (LPF) with a cutoff frequency $f_c$ is merely inserted.
Figure 4:
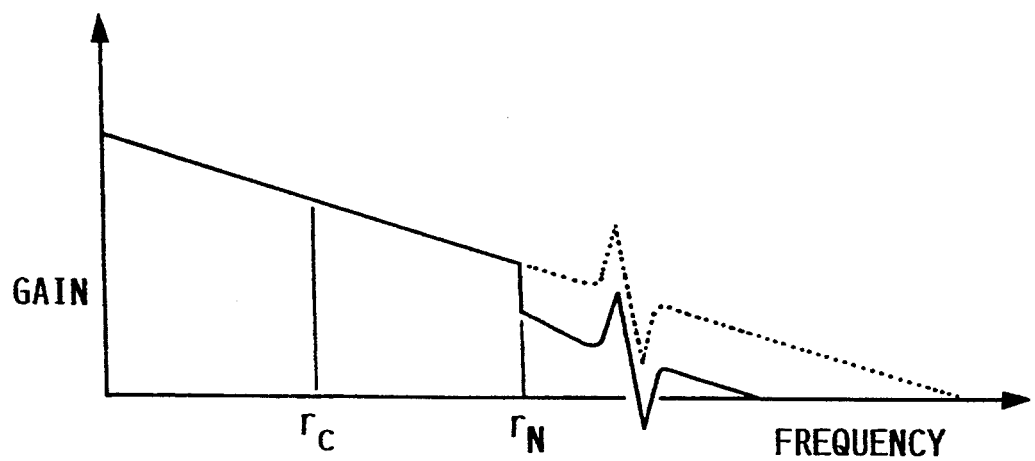

FIG. 3 shows the frequency characteristic in the case where the LPF 20 with a cutoff frequency $f_c$ is inserted as shown in FIG. 1. In this embodiment, the LPF 20 is a first-order filter, and therefore its characteristic curve shows further attenuation of $-6dB/oct$ as compared with the characteristic curve of FIG. 2 (shown by a dotted line in FIG. 3). The total attenuation in the high frequency region above the cutoff frequency $f_c$ is $-18$dB/oct. In addition to the attenuation of the peak occurring in the high frequency region due to the mechanical resonances, the gain in the lower frequency region is also reduced due to the insertion of the LPF 20. Therefore, the present invention digitally compensates for the loss in the frequency region between the cutoff frequency $f_c$ and the Nyquist frequency $f_N$ so that the original characteristic appears in the region below the Nyquist frequency. FIG. 4 shows this aspect. As shown, the frequency characteristic in the low frequency region below the Nyquist frequency $f_N$, that is, in the digitally controllable frequency region, is substantially the same as the characteristic shown in FIG. 2 and only the high frequency region above the Nyquist frequency is significantly attenuated. The cutoff frequency $f_c$ of the LPF 20 should be set to sufficiently attenuate the a peak portion in the high frequency region. Depending on a frequency at which a mechanical resonance occurs, it is preferable to set $f_c$ to about 1/5 to 1/20 of the Nyquist frequency $f_N$ if the LPF 20 is a first-order filter. With a lower cutoff frequency, digital compensation for the loss in the low frequency region may not be completely made and with a higher cutoff frequency, the peak may not be sufficiently reduced. A second or higher order filter would allow higher cutoff frequencies, but the optimum design of digital control would become complicated. Practically, a first-order filter is sufficient.

A method of optimum design for digitally compensating for the loss, due to the insertion of the LPF 20, in the low frequency region is next described. Although it is preferable that the digital control involving the compensation is implemented by the microprocessor 16, it is also possible to provide a separate digital compensator, as described later. In the following description, "low frequency region" means a digitally controllable frequency region below the Nyquist frequency. In the low frequency region, the actuator comprises a double integral system and, therefore, a transfer function $f(s)$ of a controlled system including a LPF with a time constant a can be written as follows:

$$f(s) = \frac{bc}{s^2(s + a)}$$

In Equation 1, b is an input gain and c is an output gain. Actually, there exist some resonance modes, but they are neglected here since their frequencies are higher than the Nyquist frequency. Equation 1 can be expressed, by a state equation at a time t, as shown in Equation 2 and an output equation can be expressed as shown in Equation 3, [Equation 2]

$$\begin{bmatrix} x'(t) \\ x''(t) \\ x'''(t) \end{bmatrix} = \begin{bmatrix} 0 & 1 & 0 \\ 0 & 0 & 1 \\ 0 & 0 & -a \end{bmatrix} \begin{bmatrix} x(t) \\ x'(t) \\ x''(t) \end{bmatrix} + \begin{bmatrix} 0 \\ 0 \\ b \end{bmatrix} u(t)$$

Figure 5:
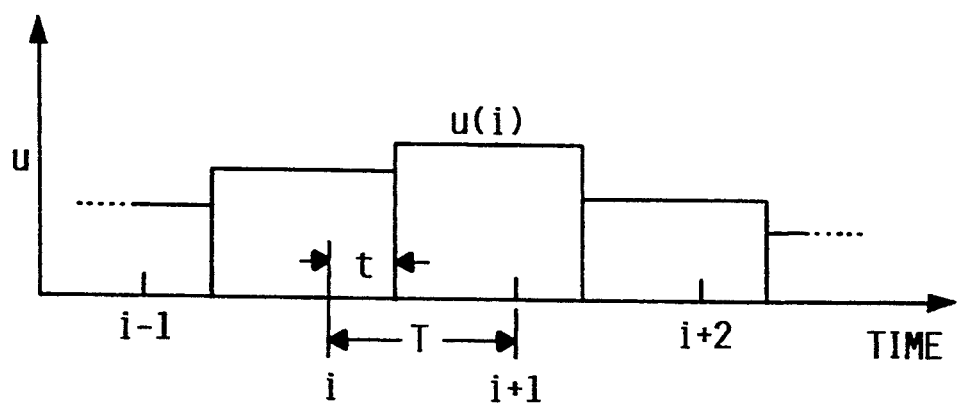
FIG. 5 is a graph showing an output from a digital-to-analog converter in the case where there exists a computational delay.

[Equation 3]

$$y(t) = [c\ 0\ 0] \begin{bmatrix} x(t) \\ x'(t) \\ x''(t) \end{bmatrix}$$

Where x'(t), x''(t), etc. in Equation 2 and Equation 3 denote the first derivative (velocity), the second derivative (acceleration), etc. of a head position x(t), respectively, u(t) in Equation 2 is an input of the controlled system (output of the DAC 18) at time t and y(t) in Equation 3 is an output of the controlled system (input of the ADC 14) at the time t. As is obvious from Equation 3, y(t) is proportional to the head position x(t) at time t, and y(t)=x(t) if c is 1. The head position can be detected by sampling angles of the actuator with a period of T ($=\frac{1}{2}f_N$). The output of the DAC 18, u(t), is obtained by analog conversion of the digital output from the microprocessor 16. However, since there is a computational delay in the microprocessor 16 as shown in FIG. 5, Equation 2 and Equation 3 are discretized with the sampling period T as follows:
[Equation 4]

$$\begin{bmatrix} x(i+1) \\ x'(i+1) \\ x''(i+1) \end{bmatrix} = A1 \begin{bmatrix} x(i) \\ x'(i) \\ x''(i) \end{bmatrix} + B1 \cdot u(i) + B2 \cdot u(i-1)$$

[Equation 5]

$$y(i) = [c\ 0\ 0] \begin{bmatrix} x(i) \\ x'(i) \\ x''(i) \end{bmatrix}$$

In Equation 4, a coefficient A1 at the right side is a square matrix having three rows and three columns and each of coefficients B1 and B2 is a column vector having three elements. Representing the coefficients arrayed in three rows and three columns at the right side of Equation 2 by A, we can write A1 as follows:
[Equation 6]

$$A1 = \exp(AT)$$

Also, representing the column vector having three elements (0 0 b) at the right side of Equation 2 by B, we can write the coefficients B1 and B2 as follows:
[Equation 7]

$$B1 = B \int_0^{T-\tau} \exp(At)dt$$

[Equation 8]

$$B2 = B \int_{T-\tau}^{T} \exp(At)dt$$

The right side of Equation 6 can be expanded as follows:
[Equation 9]

$$A1 = I + AT + \frac{(AT)^2}{2!} + \frac{(AT)^3}{3!} + \ldots$$

By analytically solving the above, we can obtain the following result:
[Equation 10]

$$A1 = \begin{bmatrix} 1 & T & -(1 - aT - \exp^{-aT})/a^2 \\ 0 & 1 & (1 - \exp^{-aT})/a \\ 0 & 0 & \exp^{-aT} \end{bmatrix}$$

Representing three elements of the column vector B1 by b11, b21 and b31 in a descending order, then they can be expressed as follows:
[Equation 11]

$$b11 = b\frac{1 - a(T - \tau) + \frac{a^2(T - \tau)^2}{2} - \exp^{-a(T-\tau)}}{a^3}$$

[Equation 12]

$$b21 = -b\frac{1 - a(T - \tau) - \exp^{-a(T-\tau)}}{a^2}$$

[Equation 13]

$$b31 = b\frac{1 - \exp^{-a(T-\tau)}}{a}$$

Similarly, representing three elements of the column vector B2 by b12, b22 and b32 in a descending order, then they can be expressed as follows: [Equation 14]

$$b12 = -b\frac{a\tau - \frac{a^2\tau(T-\tau)}{2} + \exp^{-aT} - \exp^{-a(T-\tau)}}{a^3}$$

[Equation 15]

$$b22 = b\frac{a\tau + \exp^{-aT} - \exp^{-a(T-\tau)}}{a^2}$$

[Equation 16]

$$b32 = -b\frac{\exp^{-aT} - \exp^{-a(T-\tau)}}{a}$$

Since an actual servo system includes an integrator, Equation 4 and Equation 5 can be rewritten by using a digital integral term v as follows:
[Equation 17]

$$\begin{bmatrix} x(i+1) \\ x'(i+1) \\ x''(i+1) \\ u(i) \\ v(i+1) \end{bmatrix} = \begin{bmatrix} b12 & 0 \\ A1 & b22 & 0 \\ & b32 & 0 \\ 0 & 0 & 0 & 0 & 0 \\ c & 0 & 0 & 0 & 1 \end{bmatrix} \begin{bmatrix} x(i) \\ x'(i) \\ x''(i) \\ u(i-1) \\ v(i) \end{bmatrix} + \begin{bmatrix} b11 \\ b21 \\ b31 \\ 1 \\ 0 \end{bmatrix} u(i)$$

[Equation 18]

$$y(i) = [c\ 0\ 0\ 0\ 0] \begin{bmatrix} x(i) \\ x'(i) \\ x''(i) \\ u(i-1) \\ v(i) \end{bmatrix}$$

Figure 6:
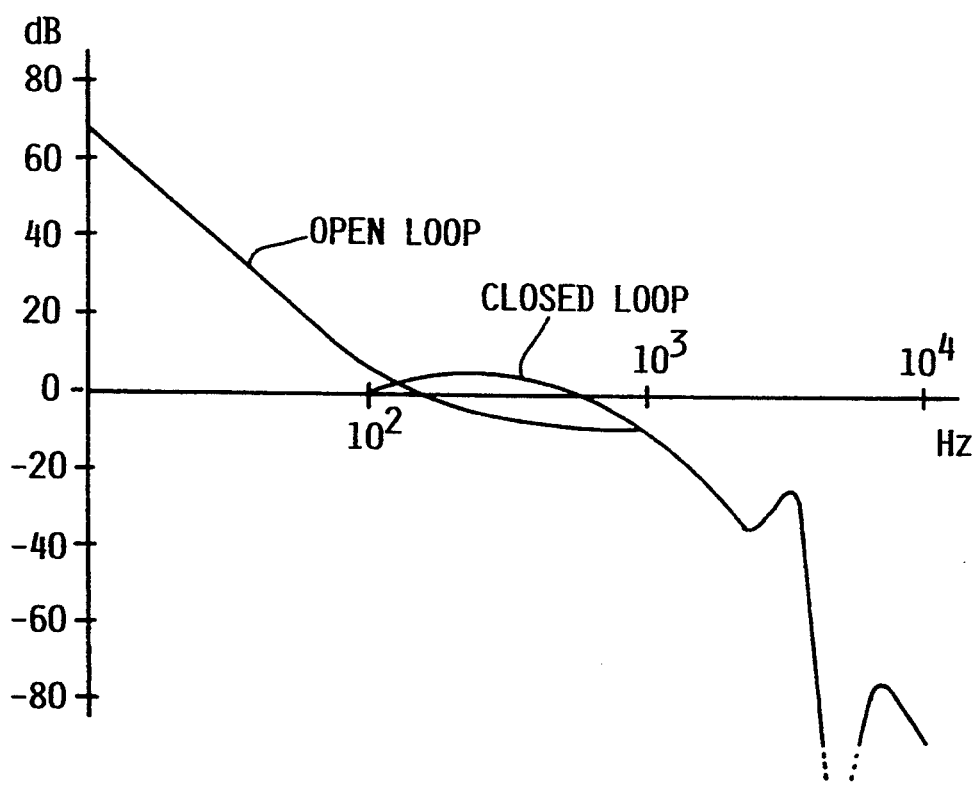
FIG. 6 is a graph showing an example of a frequency response of an actuator control system to which the present invention is actually applied.

Thus, a feedback gain can be obtained by applying a well-known optimum control theory (for example, LQ method) thereto. In this case, only the state variable x(i) which represents a head position can be directly observed and the state variable x'(i) and x−(i) which represent a velocity and an acceleration of the head, respectively, must be estimated by using a state estimator such as Kalman filter or the like. FIG. 6 shows a Bode diagram for open and closed loops obtained when the present invention is applied to an actual servo system. In this example, a sampling frequency is 4680 Hz and a computational delay is 100 s. A phase margin of about 30 and a gain margin of −6dB can be obtained with an open loop bandwidth of 300 Hz. The closed loop curve shows that high frequency gain is significantly reduced in the high band above the Nyquist frequency (=2340 Hz). Thus, by designing a digital control system to optimally control a controlled system based on Equation 1, a system which remarkably attenuates peaks due to mechanical resonances in the high frequency region and compensates for loss from the cutoff frequency $f_c$ to the Nyquist frequency $f_N$, is obtained.

Figure 7:
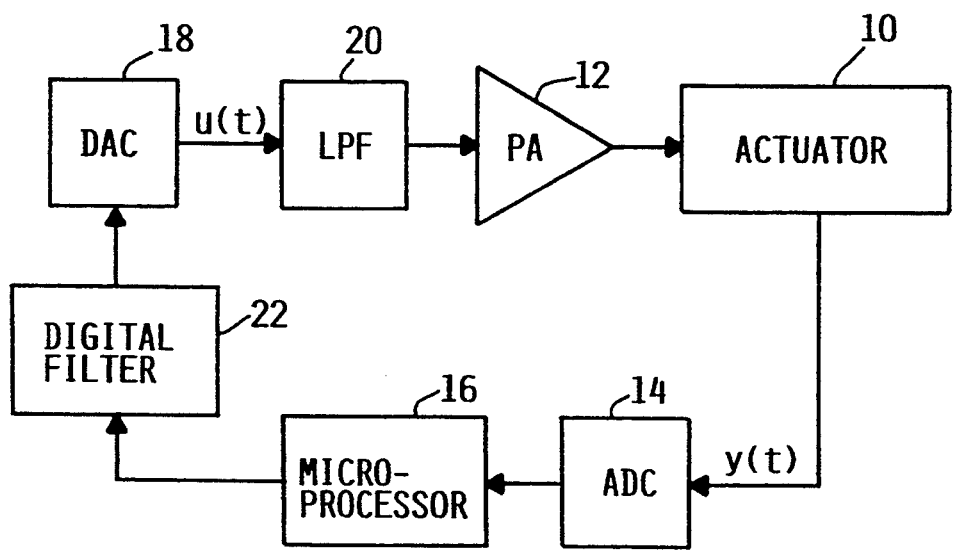
FIG. 7 is a block diagram showing another embodiment of the present invention.

Design methods other than the above state feedback method may be used which, for example, obtain a transfer function from Equation 4 and Equation 5 and stabilize a system based on a classical technique. In any case, it is preferable that a designed digital control system is implemented by a microprocessor. The loss caused by the insertion of the LPF may also be compensated for by a separate digital filter in which a conventional control algorithm in the microprocessor remains unchanged (1/(s+a) is not contained in Equation 1). FIG. 7 shows this example.

In FIG. 7, a digital filter 22 connected between the microprocessor 16 and the DAC 18 is designed to compensate for the loss shown in FIG. 3. Assuming that the LPF 20 is a first-order filter, compensation for the attenuation of −6dB/oct in the region from its cutoff frequency $f_c$ to the Nyquist frequency $f_N$ can be made by giving to the digital filter 22 opposite characteristic, that is, frequency characteristic with gain increasing at the rate of +6dB/oct from $f_c$ to $f_N$. Its transfer function can expressed in a form of z-transformation suitable for digital control as follows:
[Equation 19]

$$f(z) = 1 + az^{-1}$$

The preferred embodiments of the present invention have been described hitherto. However, the present invention is not limited to the embodiments and allows various modifications. For example, it will be appreciated that a second or higher order filter may be used as the LPF 20 although design for digital control becomes somewhat complicated. It will be appreciated also that if it is desired to more significantly reduce the peaks in the high frequency region, a conventional notch filter may be used together with the present invention. Then, the control of resonance modes of a head suspension may be looser. If the notch filter is used, it is preferable to connect it between the DAC 18 and the LPF 20. However, since the LPF may be actually implemented by a single capacitor, there would be an advantage of reduced cost if only the LPF is used.

According to the present invention, the resonance modes may not be strictly controlled as compared with the conventional measures taken against mechanical resonances, and a LPF is inexpensive as compared with a notch filter because it call be mode by a single capacitor.

Although a specific embodiment along with certain alternate embodiments of the present invention have been disclosed, it will be understood by those skilled in the art that additional variations in form and detail may be made within the scope of the following claims:

What is claimed is:

1. A digital actuator controller for generating a control signal to an actuator driven by a power amplifier in response to a position signal from said actuator, which position signal is used to position a head coupled to said actuator, comprising:
   a low-pass filter connected between said power amplifier and a digital-to-analog converter for converting said control signal to an analog signal;
   and digital control means for digitally compensating for loss caused by the insertion of said low-pass filter.

2. The digital actuator controller according to claim 1, wherein the cutoff frequency of said low-pass filter is set so that a peak in a frequency region above a Nyquist frequency is sufficiently reduced.

3. The digital actuator controller according to claim 2, wherein said low-pass filter is a first-order filter and said cutoff frequency is set within the range from a fifth to a twentieth of said Nyquist frequency.

4. The digital actuator controller according to claim 3, wherein said digital control means compensates for loss in a frequency region below said Nyquist frequency.

5. The digital actuator controller according to claim 2, wherein said low-pass filter is a second or higher order filter.

6. The digital actuator controller according to claim 5, wherein said digital control means compensates for loss in a frequency region below said Nyquist frequency.

7. The digital actuator controller according to claim 2, wherein said digital control means compensates for loss in a frequency region below said Nyquist frequency.

8. The digital actuator controller according to claim 7 wherein said digital control means is a microprocessor.

9. The digital actuator controller according to claim 8, wherein said microprocessor is designed to optimally control a system including said low-pass filter.

10. The digital actuator controller according to claim 7 wherein said digital control means is a digital filter having an opposite characteristic to said low-pass filter.

11. A digital actuator controller comprising:
    an actuator, a power amplifier for driving said actuator, an analog-to-digital converter for converting a position signal from said actuator into a digital signal, digital control means for receiving said digital signal and generating a digital control signal to said actuator, a digital-to-analog converter for converting said control signal into an analog signal, and a low-pass filter connected between said digital-to-analog converter and said power amplifier, said digital control means including means for digitally compensating for loss caused by the insertion of said low-pass filter.

12. The digital actuator controller according to claim 11, wherein a cutoff frequency of said low-pass filter is set so that a peak in a high frequency region above a Nyquist frequency is sufficiently reduced.

13. The digital actuator controller according to claim 12, wherein said low-pass filter is a first-order filter and said cutoff frequency is set within the range from a fifth to a twentieth of the Nyquist frequency.

14. The digital actuator controller according to claim 13, wherein said compensating means compensates for loss in the frequency region below said Nyquist frequency.

15. The digital actuator controller according to claim 12, wherein said low-pass filter is a second or higher order filter.

16. The digital actuator controller according to claim 15, wherein said compensating means compensates for loss in the frequency region below said Nyquist frequency.

17. The digital actuator controller according to claim 12, wherein said compensating means compensates for loss in the frequency region below said Nyquist frequency.

18. The digital actuator controller according to claim 17 wherein said digital control means is a microprocessor.

19. The digital actuator controller according to claim 18, wherein said microprocessor is designed to optimally control a system including said low-pass filter.

20. The digital actuator controller according to claim 18, wherein said compensating means is a digital filter having an opposite characteristic to said low-pass filter.

* * * * *